United States Patent
Ferlicca

(10) Patent No.: US 6,494,300 B1
(45) Date of Patent: Dec. 17, 2002

(54) METHOD FOR MAKING FRICTION DAMPER FOR LINEN WASHING MACHINE, AND THE FRICTION DAMPER MADE THEREBY

(76) Inventor: Roberto Ferlicca, Via Piave, 66, 20040 Busnago (Milano) (IT)

(*) Notice: Subject to any disclaimer, the term of this patent is extended or adjusted under 35 U.S.C. 154(b) by 0 days.

(21) Appl. No.: 09/831,956
(22) PCT Filed: Nov. 17, 1999
(86) PCT No.: PCT/IT99/00371
§ 371 (c)(1),
(2), (4) Date: Aug. 2, 2001
(87) PCT Pub. No.: WO00/29200
PCT Pub. Date: May 25, 2000

(30) Foreign Application Priority Data

Nov. 17, 1998  (IT) .......................................... MI98A2492

(51) Int. Cl.[7] .................................................. B60T 7/12
(52) U.S. Cl. ..................... 188/129; 188/381; 267/201; 264/154; 264/156
(58) Field of Search .................. 188/129, 130, 188/381; 267/196, 201; 264/154, 156

(56) References Cited

U.S. PATENT DOCUMENTS 4,929,410 A * 5/1990 Meyer et al. ................ 264/533
4,934,493 A * 6/1990 Bauer et al. ................. 188/381
5,295,804 A * 3/1994 Dinnan ........................ 425/182
5,690,552 A * 11/1997 Siddle ......................... 463/47.7
5,946,946 A * 9/1999 Sharp et al. ................. 188/129
5,961,105 A * 10/1999 Ehrnsberger et al. ....... 267/216

* cited by examiner

Primary Examiner—Christopher P. Schwartz
Assistant Examiner—Devon Kramer
(74) Attorney, Agent, or Firm—Hedman & Costigan, P.C.

(57) ABSTRACT

A method for making a friction damper for linen washing machines which have a damper rod that is telescopically driven inside a mantle, and at least a friction element, arranged between said rod and mantle and housed in a housing cavity therefor. The method is based on a first molding step for molding a friction damper casing having a hole for housing said rod and a friction element housing cavity, and a second operating step for making, in said cavity, a plurality of restraining undercut portions for restraining said friction element. The first and second steps are carried out either simultaneously or in succession, wherein in the first molding step, a mold male element, by operating in an axial direction, provides said hole for housing therein said damper rod abutment there against a bottom portion of said friction element, said housing cavity having an inner surface mating with an outer surface of said friction element for fitting therein said friction element and a plurality of upward open recesses in said housing cavity, said upward open recesses which are made in said first step.

6 Claims, 3 Drawing Sheets

US 6,494,300 B1

METHOD FOR MAKING FRICTION DAMPER FOR LINEN WASHING MACHINE, AND THE FRICTION DAMPER MADE THEREBY

BACKGROUND OF THE INVENTION

The invention relates to a method for making a friction damper for linen washing machines.

The invention relates, moreover, to a friction damper for linen washing machines, made by the inventive method.

As is known, in linen washing machine friction dampers, the friction element, arranged between the rod and casing of the damper, must be axially restrained in its housing hollow, in order to properly operate.

In prior linen washing friction dampers, this restraining function is performed, according to a first technical solution, by a ring element which is arranged on the top of the hollow shell.

A second prior solution provides to use a suitable undercut portion for restraining the friction element, said undercut portion being made by re-processing the damper shell or casing.

However, it has been found that both the disclosed prior arrangements are not operatively satisfactory and, moreover, they cause a great increase of the cost of the finished product.

SUMMARY OF THE INVENTION

Accordingly, the aim of the present invention is to provide a method for making a friction damper for linen washing machines, allowing to make a finished shell or casing, including the necessary housing for receiving therein the friction element, without the need of performing further processing operations after the molding proper.

Within the scope of the above mentioned aim, a main object of the present invention is to provide a finished friction damper of reduced cost and which can be made in a very reduced operating time.

According to one aspect of the present invention, the above mentioned aim and object, as well as yet other objects, which will become more apparent hereinafter, are achieved by a friction damper for linen washing machines, of the type comprising a rod which can be telescopically driven inside a mantle and at least a friction element, arranged between said rod and mantle and housed in an housing cavity, characterized in that said method comprises a first molding step for molding said friction element housing cavity, in which the male element of the mold operates in an axial direction, and a second operating step for making undercut portions for restraining said friction element, said first and second steps being carried out either simultaneously or in succession.

In particular, in the first molding step, the male element of the mold, by operating in an axial direction, provides the damper rod housing hole, the friction housing plane and a plurality of upward opened recesses.

According to a preferred embodiment of the inventive method, the second operating step for forming said friction element housing cavity provides to open the mold, perpendicular to the axis of the damper mantle, to provide a plurality of undercut portions for restraining said friction element and a plurality of slots, formed on the outer surface of said friction element housing cavity or hollow.

According to a further preferred embodiment of the inventive method, the second operating step for making said friction element cavity or hollow provides to use suitable knives, operating from the bottom according to a vertical direction parallel to the mold male element to provide said friction element restraining undercut portions.

The present invention relates, moreover, to a friction damper for linen washing machines, of the type comprising a rod which can be telescopically driven in a mantle and at least a friction element, arranged between said rod and mantle and housed in a cavity therefor, characterized in that said cavity is provided with an housing plane or surface for housing said friction element, a plurality of upward open recesses, and a plurality of restraining undercut portions for restraining said friction element.

BRIEF DESCRIPTION OF THE DRAWINGS

Further advantages and characteristics of the present invention will become more apparent hereinafter from the following detailed disclosure, given by way of an illustrative but not limitative example, and with reference to the accompanying drawings where.

DESCRIPTION OF THE PREFERRED EMBODIMENTS

In the following disclosure, reference will be made to some preferred embodiments of the present invention, illustrated by way of a non limitative example of several possible variations of the invention.

Figure 1:
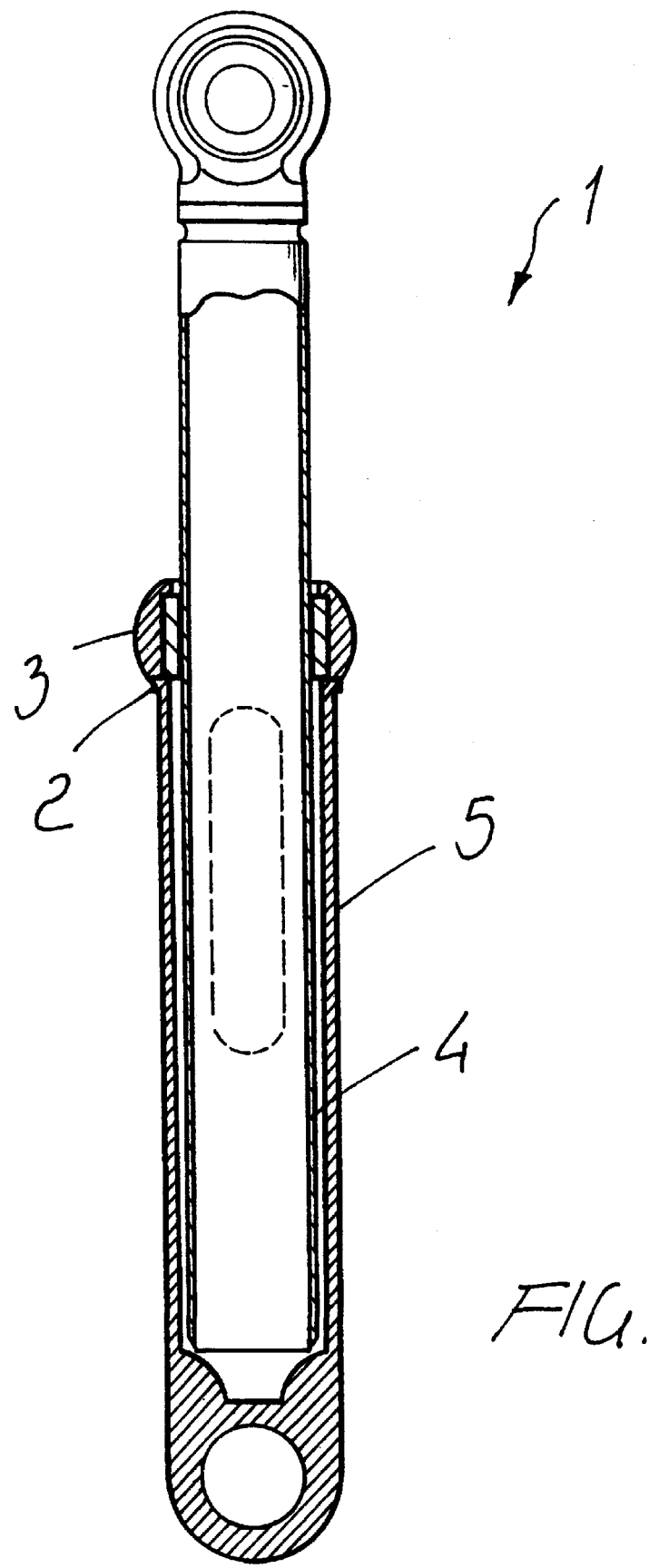
FIG. 1 is a partially cross-sectioned side view of the linen washing machine friction damper according to an embodiment of the present invention.

FIG. 1 shows, by a partially cross-sectioned view, a friction damper for linen washing machines, made according to the method of the present invention, and generally indicated by the reference number 1.

The friction damper 1, in particular, comprises a rod 4, which can be telescopically driven inside a mantle or casing 5 and comprising moreover a friction element 2 arranged between said rod 4 and mantle 5 and housed in a housing cavity or hollow 3 therefor; said mantle 5 including, in turn, a pair of windows 9.

The cavity 3 is provided with a housing plane or surface 8 for housing said friction element 2, as well as with a plurality of upward open recesses 7, and a plurality of undercut portions 6 for restraining said friction element 2.

Figure 2:
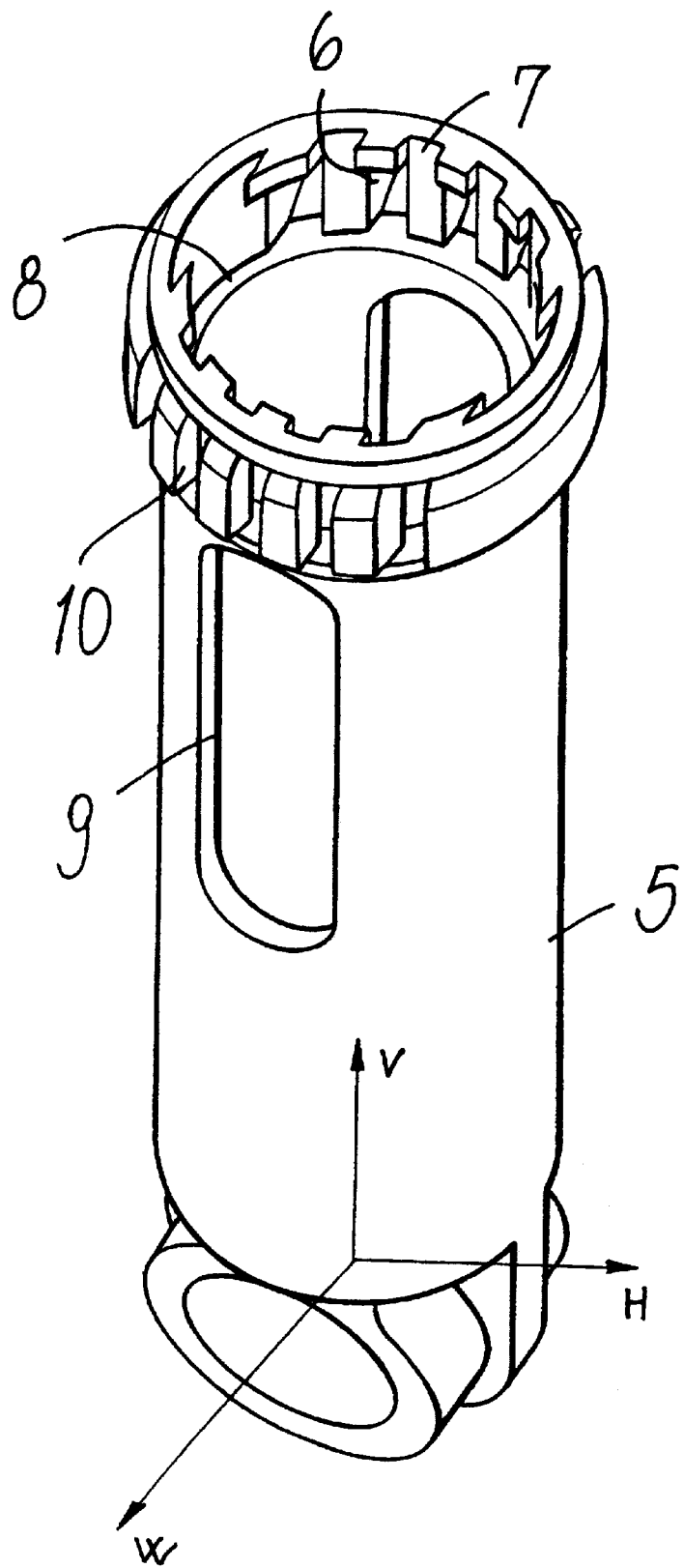
FIG. 2 is an axonometric view of a further embodiment of the present invention.

This embodiment is shown, by an axonometric view, in FIG. 2.

Figure 3:
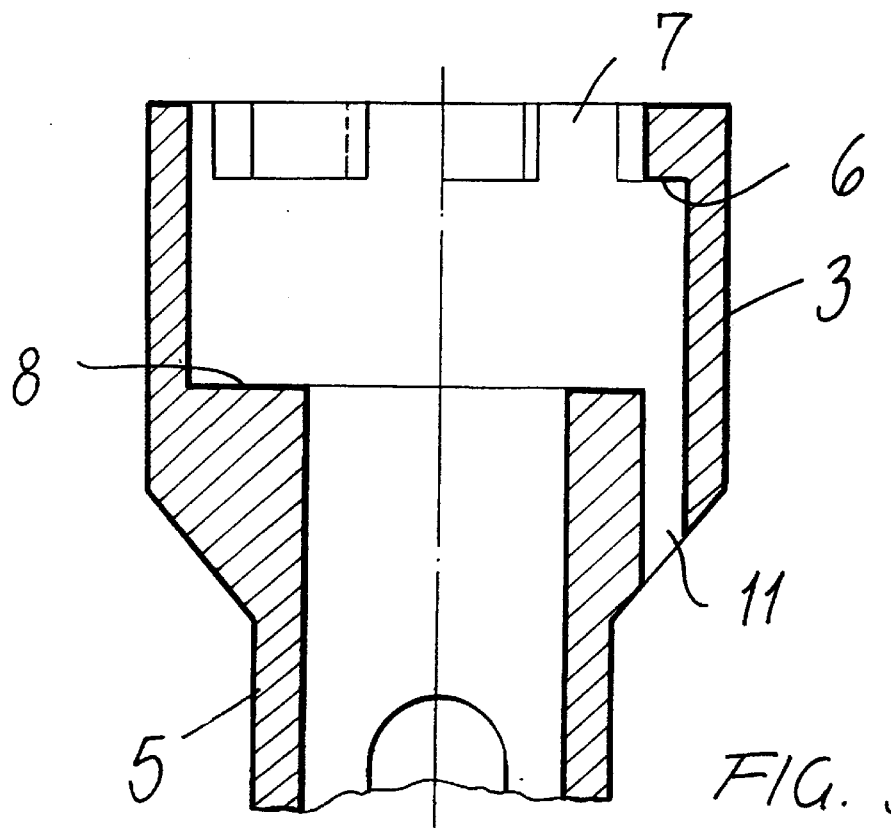
FIG. 3 is a cross-sectional view, substantially taken along the section line III—III, of a modified embodiment of the present invention.
Figure 4:
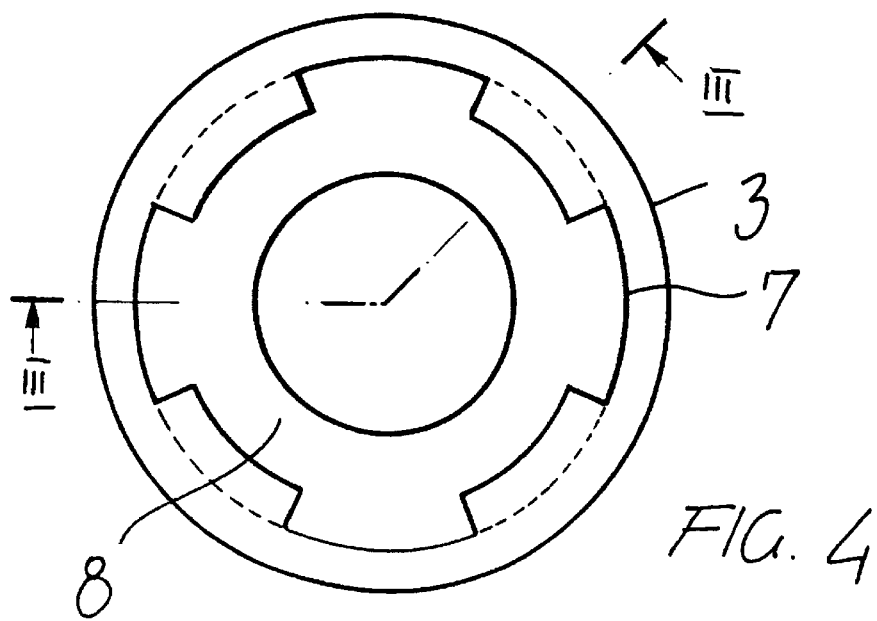
FIG. 4 is a top plan view of the embodiment of the invention shown in FIG. 3.

FIGS. 3 and 4 show a modified embodiment of the damper according to the invention, in which the cavity 3 is provided, in addition to the friction element 2 housing surface 8 and upward open recesses 7, with a plurality of not throughgoing holes 11, which end at said friction element 2 restraining undercut portions 6.

In particular, the cavities 3 for housing the friction elements 2 of the friction dampers shown in the above mentioned figures are made by the following method.

More specifically, the inventive method comprises a first operating molding step, in which the male element of the mold, by operating in an axial direction, and in particular in the direction V shown in FIG. 2, provides the housing hole for housing therein the rod 4 of the damper 1, as well as the friction element 2 housing surface 8 and the upward open recesses 7.

The subject method comprises moreover a second operating step for making the friction element 2 restraining undercut portions 6, which second step is carried out simultaneously with the opening of the mold.

In particular, said second operating step, for making said friction element 2 housing cavity 3, can be carried out according two different operating modes.

The first of said operating modes provides to open the mold, perpendicularly to the axis of the damper mantle 5 and, in particular, in the direction W shown in FIG. 2, so as to provide the friction element 2 restraining cutout portions 6 and, simultaneously, a plurality of slots 10 formed on the outer surface of the friction element 2 housing cavity 3.

The second of the above mentioned operating modes for making said cavity 3 for housing therein said friction element 2, provides to use suitable operating knives, operating from the bottom according to a vertical direction parallel to the mold male element, said knives forming non-throughgoing holes 11 ending at the friction element 2 restraining or holding undercut portions 6.

In this connection it should be pointed out that, in both said operating modes, the numbers and positions of the upward open recesses 7 and undercut portions 6 can be changed depending on requirements.

Thus, the above disclosed method, in its main variations, allows to make a finished shell enclosing therein the cavity 3 for housing therein the friction element 2, thereby obviating any requirements of carrying out further processing steps after the molding, thereby greatly reducing the cost of the finished product and the making times therefor.

From the above disclosure it should be apparent that the invention fully achieves the intended aim and objects.

What is claimed is:

1. A method for making a friction damper for linen washing machines which comprise a damper rod which is telescopically driven inside a mantle, and at least a friction element, to be arranged between said rod and mantle and housed in a housing cavity therefor, said method comprising a first molding step for molding a friction damper casing having a hole for housing said rod and a friction element housing cavity, and a second operating step for making, in said cavity, a plurality of restraining undercut portions for restraining said friction element, said first and second steps being carried out either simultaneously or in succession, wherein in that in said first molding step, a mold male element, by operating in an axial direction, provides said hole for housing therein said damper rod abutment there against a bottom portion of said friction element, said housing cavity having an inner surface mating with an outer surface of said friction element for fitting therein said friction element and a plurality of upward open recesses in said housing cavity, said upward open recesses being made in said first step.

2. A method according to claim 1, wherein said second operating step comprises opening of said mold, perpendicularly to the axis of said damper mantle, to provide said plurality of restraining undercut portions for restraining said friction element and a plurality of slots, formed on the outer surface of said friction element housing cavity.

3. A method according to claim 1, wherein a second operating step uses suitable knives, operating from the bottom in a vertical direction parallel to said mold male element, to form a plurality of holes ending at said friction element restraining undercut portions.

4. A friction damper for linen washing machines, made by a method according to claims 1 to 3 said damper being of the type comprising a rod which can be telescopically driven inside a mantle and at least a friction element, arranged between said rod and mantle and housed in a housing cavity therefore said cavity being provided with an inner housing surface for housing said friction element, wherein said inner surface of said cavity comprises a plurality of upward open recesses, and a plurality of undercut restraining portions for restraining said friction element.

5. A friction damper, according to claim 4, wherein said friction element restraining undercut portions are associated with slots formed on an outer surface of said friction element housing cavity.

6. A friction damper, according to claim 4, wherein said friction element restraining undercut portions are associated with a plurality of holes, formed in a substantially vertical direction on the bottom portion of the shell of said friction element housing cavity, said holes ending at said friction element undercut portions.

* * * * *